United States Patent
Ishizuka

(10) Patent No.: US 9,216,648 B2
(45) Date of Patent: Dec. 22, 2015

(54) WHEEL DRIVING DEVICE

(75) Inventor: Masayuki Ishizuka, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 459 days.

(21) Appl. No.: 13/525,485

(22) Filed: Jun. 18, 2012

(65) Prior Publication Data

US 2013/0009449 A1    Jan. 10, 2013

(30) Foreign Application Priority Data

Jul. 8, 2011    (JP) .................. 2011-152316
Jul. 20, 2011   (JP) .................. 2011-159435

(51) Int. Cl.
 B60K 17/04     (2006.01)
 B60B 27/00     (2006.01)

(52) U.S. Cl.
  CPC ............. B60K 17/043 (2013.01); B60B 27/001 (2013.01); B60B 27/0005 (2013.01)

(58) Field of Classification Search
  CPC .............. B60B 27/0005; B60B 27/001; B60B 27/0078; B60B 19/00; B60K 17/043; B60K 17/14; F16H 57/021; F16C 19/163
  USPC ................... 301/6.5; 475/162, 331; 384/544; 180/65.51, 65.6, 65.7; 74/606 R
  See application file for complete search history.

(56) References Cited

U.S. PATENT DOCUMENTS

| | | | |
|---|---|---|---|
| 1,919,925 A | 7/1933 | Blakeslee | |
| 2,317,623 A * | 4/1943 | Lee | 180/234 |
| 2,430,528 A * | 11/1947 | Moon | 180/253 |
| 3,749,195 A | 7/1973 | Vegners | |
| 3,770,074 A * | 11/1973 | Sherman | 180/65.6 |
| 3,969,950 A | 7/1976 | Rau et al. | |
| 4,524,644 A | 6/1985 | Pierrat | |
| 2005/0105840 A1 | 5/2005 | Muranaka et al. | |

FOREIGN PATENT DOCUMENTS

| | | |
|---|---|---|
| CN | 101067442 A | 11/2007 |
| DE | 2 316 932 A1 | 10/1974 |
| DE | 100 61 221 A1 | 6/2002 |
| GB | 1 517 112 | 7/1978 |
| JP | 59-152237 U | 10/1984 |
| JP | 4-90716 U | 8/1992 |
| JP | 2000-313215 A | 11/2000 |
| JP | 2003-004034 A | 1/2003 |

(Continued)

OTHER PUBLICATIONS

European Search Report application No. 12004977.0 dated Nov. 20, 2012.

*Primary Examiner* — Kip T Kotter
(74) *Attorney, Agent, or Firm* — Squire Patton Boggs (US) LLP

(57) ABSTRACT

Provided is a wheel driving device which drives a wheel by output rotation of a reduction device disposed on an inside in a radial direction of the wheel. The reduction device includes an output member connected to the wheel, and a pair of bearings supporting the output member. In the pair of bearings, the bearing on a side opposite to a vehicle body has a smaller outer diameter than that of the bearing on a vehicle body side. An injection passage member of a medium injected into the wheel may be disposed on an outside in a diameter direction of the bearing on the side opposite to the vehicle body.

6 Claims, 6 Drawing Sheets

(56) References Cited

FOREIGN PATENT DOCUMENTS

| JP | 2006-117003 A | 5/2006 |
| JP | 2006-316884 A | 11/2006 |
| JP | 2006-341626 A | 12/2006 |
| JP | 2008-256160 A | 10/2008 |
| JP | 2009-041747 A | 2/2009 |
| JP | 2010-159794 A | 7/2010 |
| JP | 2011-105211 A | 6/2011 |
| WO | 2007/083209 A1 | 7/2007 |

* cited by examiner

WHEEL DRIVING DEVICE

CROSS REFERENCE TO RELATED APPLICATIONS

Priority is claimed on Japanese Patent Application No. 2011-159435, filed on Jul. 20, 2011, and Japanese Patent Application No. 2011-152316, filed on Jul. 8, 2011, the entire content of which is incorporated herein by reference.

BACKGROUND

1. Field

The present invention relates to a wheel driving device that drives the wheels of a vehicle.

2. Description of the Related Art

For example, in the related art, a power transmission device that drives the wheels of a forklift truck is disclosed. The forklift truck disclosed in the related art includes, as a wheel driving device for driving wheels, a motor and a reduction device that reduces the rotation of the motor.

The reduction device has a reduction mechanism having a single-stage parallel shaft reduction mechanism and a simple planetary gear reduction mechanism. Particularly, a part of the simple planetary gear reduction mechanism is disposed at a position indented to the inside in a radial direction of the wheels.

SUMMARY

According to an embodiment of the present invention, there is provided a wheel driving device which drives a wheel by output rotation of a reduction device disposed on an inside in a radial direction of the wheel. The reduction device includes an output member connected to the wheel, and a pair of bearings supporting the output member. In the pair of bearings, the bearing on a side opposite to a vehicle body has a smaller outer diameter than that of the bearing on a vehicle body side. An injection passage member of a medium injected into the wheel is disposed on an outside in a diameter direction of the bearing on the side opposite to the vehicle body.

DETAILED DESCRIPTION

Figure 1:
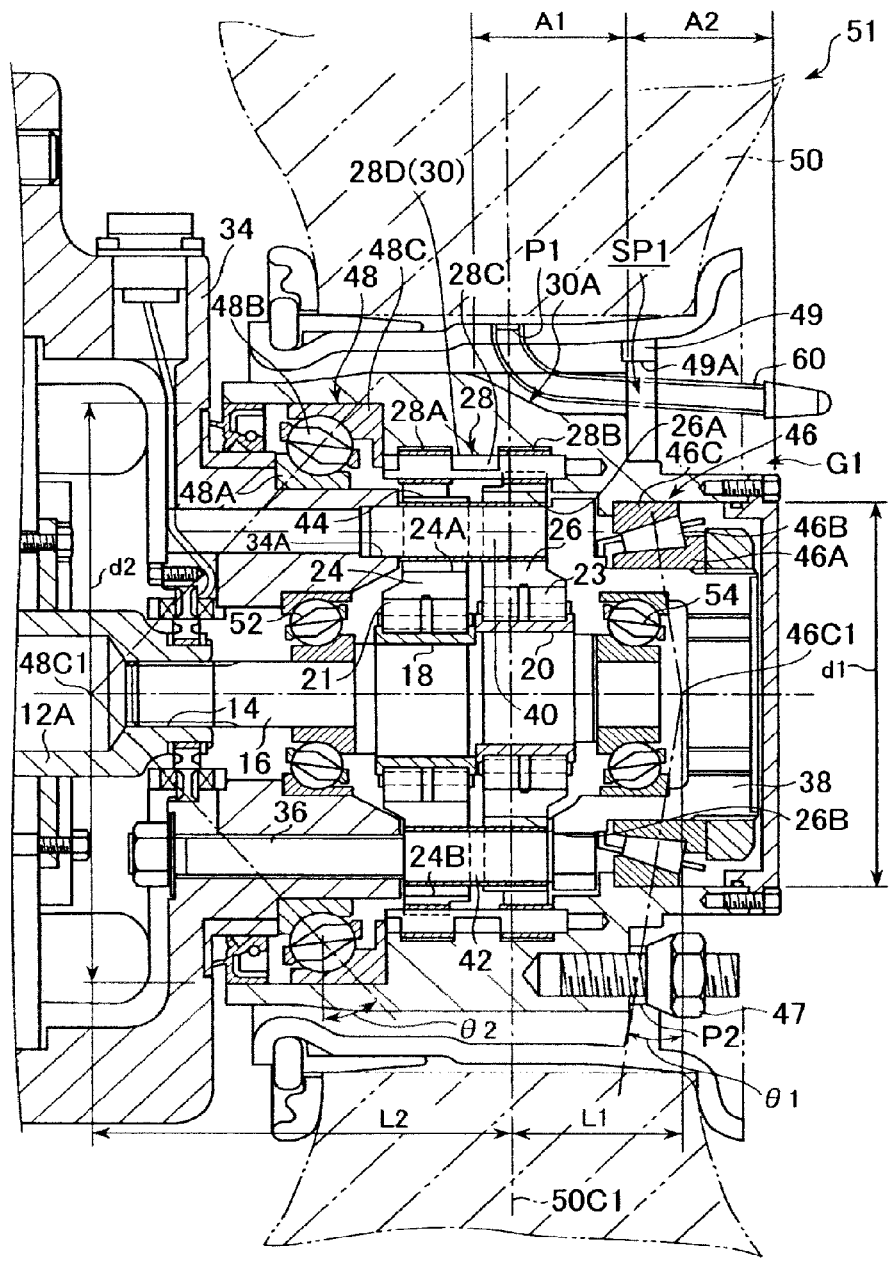
FIG. 1 is a cross-sectional view of the main part illustrating a configuration example in which a reduction device according to an example of an embodiment of the present invention is applied to a wheel driving device of a forklift truck.

In the forklift truck, there are many accessories such as a hydraulic pump for raising and lowering the load of the forks and a tank as well as a large battery. Therefore, unless a limited space is effectively used, the entirety of the forklift truck is unnecessarily increased in size. Therefore, there is a strong demand for putting the device for driving wheels into a space as small as possible (close to the wheels).

However, since the forklift truck has forks for raising and lowering a load in front of the front wheels, the forklift truck has a structure in which a counterbalance (counterweight) is disposed on the rear side from the center of gravity of the forklift truck. In order to reduce the magnitude of the counterbalance, the center of gravity of each of the forks and the load loaded on the forks has to come as close as possible to the ground positions of the front wheels. From this standpoint, the smaller the diameters of the wheels are, the better the forklift truck is.

Regardless of this, in order to support a large weight of the load loaded on the forks, the volume of the tire (rubber part) itself of the wheel has to be ensured to be high. Therefore, in the circumstances, the space on the inside in the radial direction of the wheels is very small.

Under this background, in order to dispose the reduction device at a position further indenting to the side of the wheel opposite to the vehicle body, until now, the reduction device does not indent to the side of the wheel opposite to the vehicle body to such degree. Therefore, a new problem has emerged in that disposition of a tube for air injection (an injection passage member for a medium injected into the wheel) that has not been a problem becomes difficult.

It is desirable to, in a wheel driving device, reasonably dispose an injection passage member of a medium injected into a wheel while disposing a reduction device on a side opposite to a vehicle body as close as possible on the inside in a radial direction of the wheel.

According to the embodiment of the present invention, in the pair of bearings supporting the output member of the reduction device connected to the wheel, the outer diameter of the bearing on the side opposite to the vehicle body is smaller than the outer diameter of the bearing on the vehicle body, and a space on the outside in the diameter direction of the bearing on the side opposite to the vehicle body, the space generated as a result, is ensured as a space for disposing the injection passage member of the medium.

Therefore, using this space, the injection passage member of the medium may be drawn from the inside in the radial direction of the tire and be guided to the side opposite to the vehicle body.

According to the embodiment of the present invention, in the wheel driving device, while the reduction device is disposed on the side opposite to the vehicle body on the inside in the radial direction of the wheel as close as possible, the injection passage member of the medium injected into the wheel may be reasonably disposed.

Hereinafter, an example of an embodiment of the present invention will be described in detail with reference to the drawings.

Figure 2:
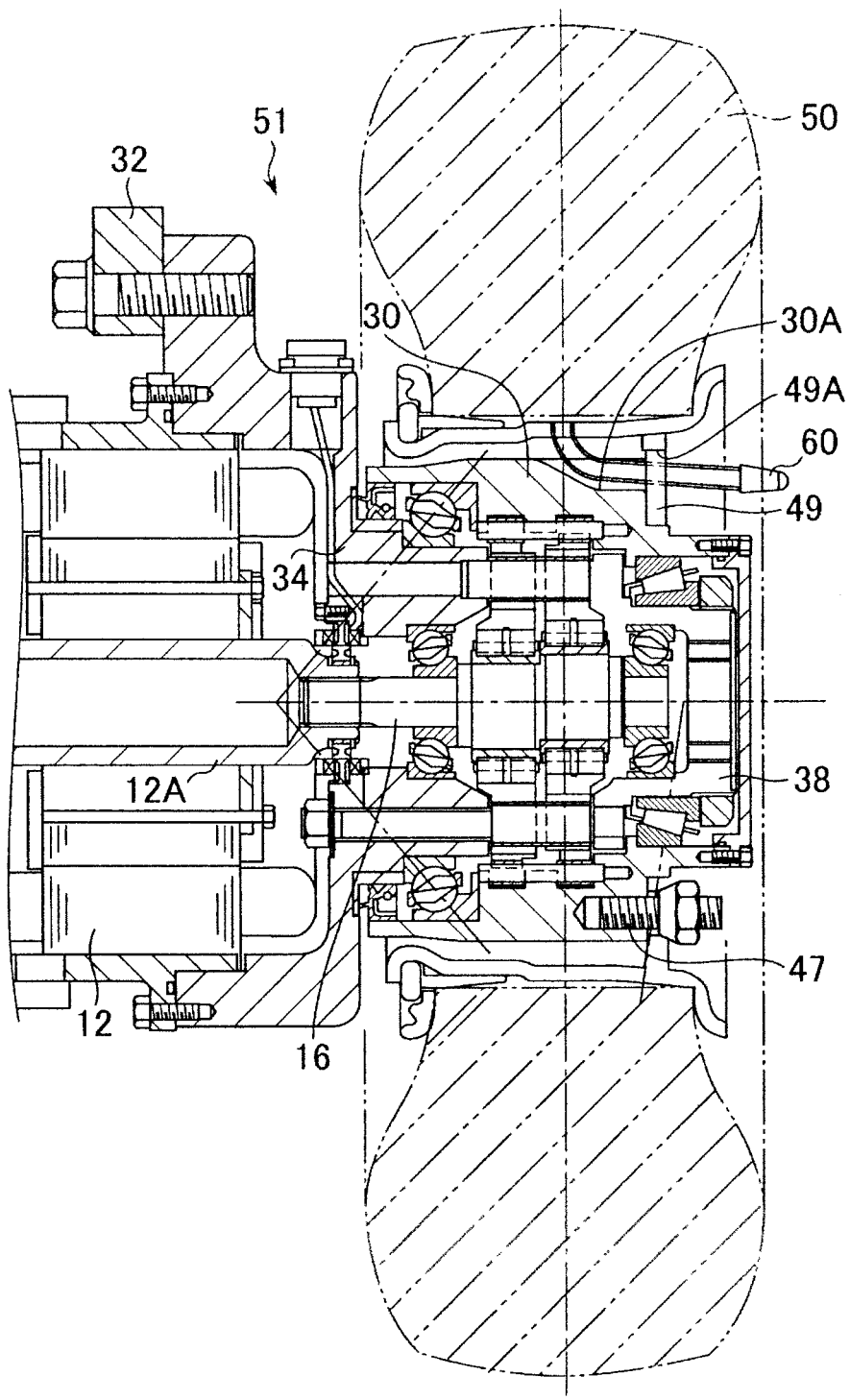
FIG. 2 is an overall cross-sectional view of FIG. 1.
Figure 3:
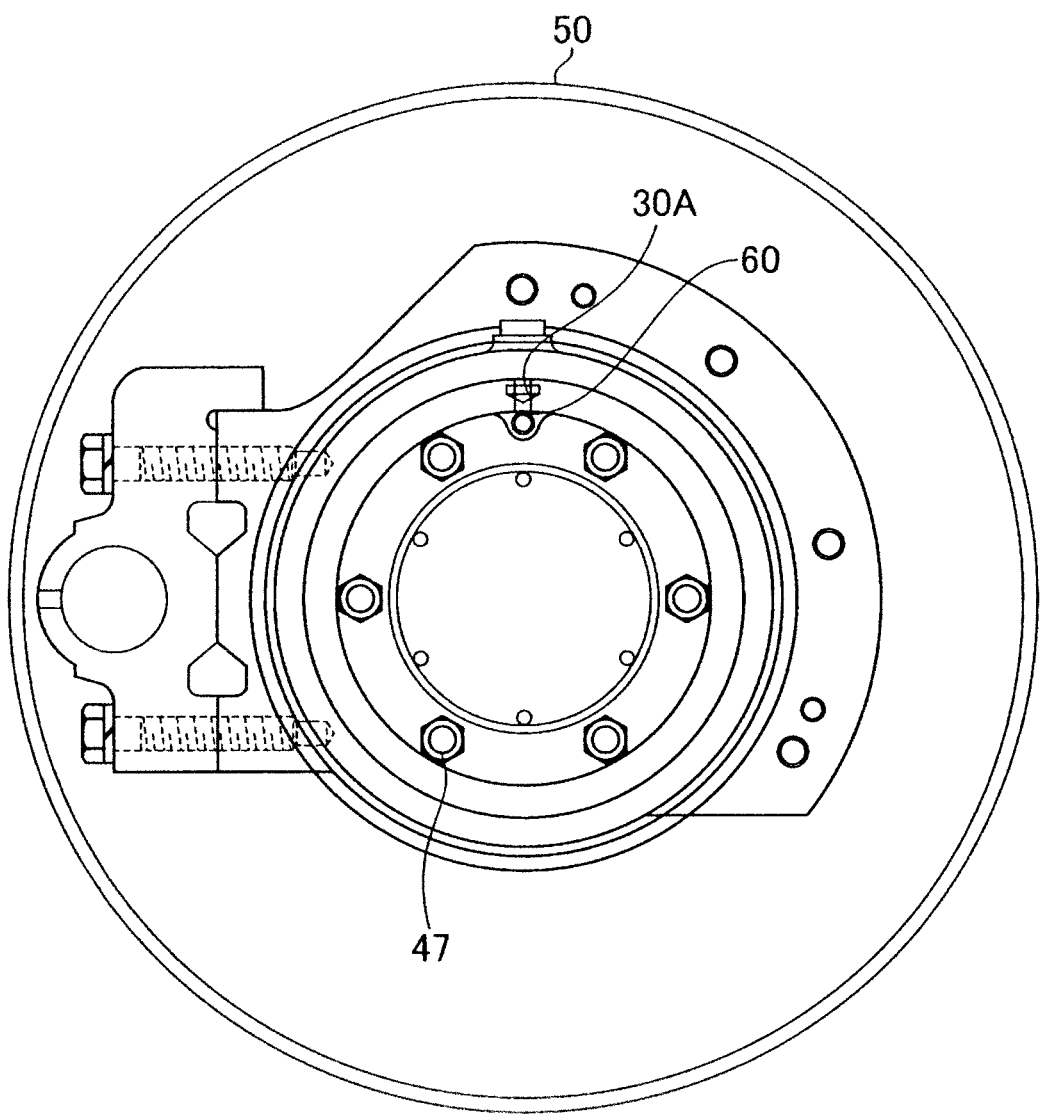
FIG. 3 is a side view of FIG. 2.

FIG. 1 is a cross-sectional view of the main part illustrating a configuration example in which a reduction device according to an example of an embodiment of the present invention is applied to a wheel driving device of a forklift truck, FIG. 2 is the overall cross-sectional view thereof, and FIG. 3 is a side view of FIG. 2.

An output shaft 12A of a motor 12 is connected to an input shaft 16 of a reduction device G1 via a spline 14. Two eccentric bodies 18 and 20 having axial centers offset from that of the input shaft 16 are formed integrally with the input shaft 16.

External gears 24 and 26 are externally fitted in the outer peripheries of the eccentric bodies 18 and 20 via bearings 21 and 23, respectively. An internal gear 28 makes an internal contact and mesh with the external gears 24 and 26.

The internal gear 28 mainly includes cylindrical internal pins 28A and 28B constituting the internal teeth, a holding pin 28C which penetrates through and rotatably holds the internal pins 28A and 28B, and an internal gear main body 28D which rotatably supports the holding pin 28C and is formed integrally with a casing 30.

The number of internal teeth of the internal gear 28 (the number of internal pins 28A and 28B) is slightly greater than the number of external teeth of the external gears 24 and 26 (in this embodiment, by only 1).

In addition, on the vehicle body side in the axial direction of the external gears 24 and 26, a flange body 34 fixed to a vehicle body frame 32 is disposed, and on a side opposite to the vehicle body in the axial direction, a carrier body 38 integrated into the flange body 34 via a carrier bolt 36 and a carrier pin 42 is disposed. An inner pin 40 is formed integrally with the carrier body 38.

The inner pin 40 penetrates through inner pin holes 24A and 26A formed to penetrate through the external gears 24 and 26 with a clearance along with a sliding augmentation member 44 and is fitted into a concave portion 34A of the flange body 34. The inner pin 40 abuts on a part of the inner pin holes 24A and 26A of the external gears 24 and 26 via the sliding augmentation member 44 and restricts the rotation of the external gears 24 and 26 (allows only oscillation).

The carrier pin 42 penetrates through carrier pin holes 24B and 26B formed to penetrate through the external gears 24 and 26 with a clearance and abuts on the end portion in the axial direction of the flange body 34. Here, the carrier pin 42 does not abut on the carrier pin holes 24B and 26B of the external gears 24 and 26 and does not contribute to the restriction of the rotation of the external gears 24 and 26.

The input shaft 16 which is an input member of the reduction device G1 is rotatably supported by the flange body 34 and the carrier body 38 via a pair of angular ball bearings 52 and 54.

The casing 30 which is an output member of the reduction device G1 is rotatably supported by the flange body 34 and the carrier body 38 fixed to the vehicle body frame 32, via a pair of main bearings (an outside bearing 46 positioned on the outside in the axial direction (the side opposite to the vehicle body) and an inside bearing 48 positioned on the inside in the axial direction (the vehicle body side). A wheel member 49 is connected to the end surface of the casing 30 on the side opposite to the vehicle body in the axial direction by a bolt 47, and a wheel (tire) 50 of the forklift truck (illustration of the entirety thereof is omitted) 51 is mounted via the wheel member 49.

In this embodiment, the outer diameter d1 of the outside bearing 46 is smaller than the outer diameter d2 of the inside bearing 48. Here, the "outer diameter" means the outer diameter of an outer race in a case of having the outer race, and the dimension from the axial center to the outermost periphery (the innermost diameter of the rolling surface) of a rolling element in a case where the outer race is formed integrally with a casing. In addition, in a space SP1 on the outside in the diameter direction of the outside bearing 46 having the small outer diameter d1, a tube 60 for air injection (an injection passage member of a medium injected into the wheel) is disposed.

Hereinafter, this construction will be described in detail.

The outside bearing 46 is constructed as a tapered roller bearing and includes an inner race 46A, a rolling element 46B, and an outer race 46C. In addition, the inside bearing 48 is constructed as an angular ball bearing and includes an inner race 48A, a rolling element 48B, and an outer race 48C.

In this embodiment, as described above, the outer diameter d1 of the outside bearing 46 is smaller than the outer diameter d2 of the inside bearing 48. In addition, the dimension L1 from the point of action 46C1 of the outside bearing 46 to a center 50C1 in the axial direction of the wheel 50 is smaller than the dimension L2 from the point of action 48C1 of the inside bearing 48 to the center 50C1 in the axial direction of the wheel (tire) 50 (L1<L2). Here, the "point of action" means the point of intersection between a line of action (a straight line connecting contact points between the rolling element and the inner and outer races) and an axial center line (a line parallel to the axial direction through the axial center).

Therefore, the outside bearing 46 is in a more severe state than the inside bearing 48 (receives a greater load). In addition, the outer diameter d1 of the outside bearing 46 is smaller than the outer diameter d2 of the inside bearing 48. Therefore, the types of the rolling elements 46B and 48B of the outside bearing 46 and the inside bearing 48 are different so that the rolling element 46B of the outside bearing is called a "conical roller" and the rolling element 48B of the inside bearing 48 is called a "ball". Specifically, the outside bearing 46 with a strict load condition and a small diameter is constructed as a conical load having a high load rating through line contact, and the inside bearing 48 with a not strict load condition and a large diameter is constricted as a "ball" with small losses through point contact. This is because ensuring the load rating of the outside bearing 46 to be greater than the load rating of the inside bearing 48 is intended (even though the outer diameter d1 of the outside bearing 46 is smaller than the outer diameter d2 of the inside bearing 48). In addition, the "load rating" is classified into a basic static load rating and a basic dynamic load rating, and in this embodiment, it is particularly effective that the outside bearing 46 is greater than the inside bearing 48 in the basic dynamic load rating.

In this embodiment, by differentiating between the types of the rolling element 46B of the outside bearing 46 and the rolling element 48B of the inside bearing 48, a significant increase in the size of the outside bearing 46 may be suppressed, so that a wide space SP1 on the outside in the radial direction of the outside bearing 46 may be effectively ensured. In addition, "having different kinds" mentioned here does not mean that simply sizes are different (not congruent but similar) but means that "the shapes themselves of the rolling elements are different".

In addition, a contact angle $\theta 1$ (an angle of the line of action with respect to the radial direction) of the outside bearing 46 is set to be smaller than a contact angle $\theta 2$ of the inside bearing 48.

The tube 60 for air injection (the injection passage member of the medium injected into the wheel) is disposed in the space SP1 ensured on the outside in the diameter direction of the outside bearing 46 of which the outer diameter d1 is formed to be small as described above.

In addition, the "medium injected into the wheel" is typically "air". However, depending on the vehicle models, the medium may be "nitrogen", or a liquid or a semisolid medium for preventing a puncture.

In this embodiment, a drawing portion P1 of the tube 60 for air injection drawn from the inside of the wheel 50 is positioned further towards the vehicle body side in the axial direction than a connection portion P2 between the casing 30 which is the output member of the reduction device G1 and the wheel member 49 of the wheel 50.

Therefore, in order to ensure the space SP1 where the tube 60 is disposed to be wider, a cutoff (groove) 30A where the tube 60 is disposed is formed in the casing 30 of the reduction device G1 along the axial direction. In addition, in the wheel member 49, a hole 49A through which the tube 60 is inserted is formed at a position (a position opposing, in the axial direction, the end portion in the axial direction of the cutoff 30A) corresponding to the cutoff 30A of the casing 30. The tube 60 drawn from the drawing portion P1 is bent outward from the vehicle body and is accommodated in the cutoff 30A of the casing 30, penetrates through the hole 49A of the wheel member 49, and is drawn to the outside of the wheel 50. Accordingly, an air injection operation (medium injection operation) may be easily performed.

Hereinafter, the actions of the reduction device G1 according to this embodiment will be described.

The rotation of the output shaft 12A of the motor 12 is transmitted to the input shaft 16 of the reduction device G1 via the spline 14. When the input shaft 16 is rotated, (the outer peripheries of) the eccentric bodies 18 and 20 do eccentric movement, and the external gear 24 and 26 are oscillated via the bearings 21 and 23. Due to this oscillation, there is a phenomenon in which the positions of engagement between the external gears 24 and 26 and the internal gear 28 are sequentially offset.

The difference between the external gears 24 and 26 and the internal gear 28 in the number of teeth is set to 1, and the rotation of each of the external gears 24 and 26 is restricted by the inner pin 40 fixed to the vehicle body frame 32 side. Therefore, whenever the input shaft 16 is rotated once, the internal gear 28 is rotated by the difference in the number of teeth with respect to the external gears 24 and 26 of which the rotation is restricted. As a result, by the rotation of the input shaft 16, the casing 30 integrated into the internal gear main body 28D is rotated at a rotation speed reduced to 1/(the number of teeth of the internal gear). By the rotation of the casing 30, the wheel (tire) 50 of the forklift truck 51 is rotated via the wheel member 49 fixed to the casing 30 (by the bolt 47).

Here, in this embodiment, from the outside bearing 46 and the inside bearing 48 forming a pair supporting the casing 30 that is the output member, the outer diameter d1 of the outside bearing 46 is formed to be smaller than the outer diameter d2 of the inside bearing 48. In addition, the tube 60 for air injection is disposed in the space SP1 on the outside in the diameter direction of the outside bearing 46 ensured as described above.

Therefore, while the overall length in the axial direction of the reduction device G1 in this embodiment is indented to the inside in the radial direction of the wheel 50, the space SP1 where the tube 60 is disposed may be ensured to be wide. That is, while the reduction device G1 is disposed on the side opposite to the vehicle body as much as possible on the inside in the radial direction of the wheel 50, the tube 60 for air injection may be reasonably disposed.

In addition, in this embodiment, since the output member is the casing 30 of the reduction device G1 (so-called frame rotation-type reduction device), the casing 30, the wheel member 49, and the wheel (tire) 50 rotate integrally without relative rotation. Therefore, there is no offset in the rotational phase between the three 30, 49, and 50. Therefore, in an area A1 of FIG. 1 (an area further toward the vehicle body side than a surface at right angle with respect to the shaft of the wheel member 49), the cutoff 30A is formed only in a part of the outer periphery of the casing 30 where the tube 60 for air injection is disposed, and the hole 49A is formed in the wheel member 49. Accordingly, the strength of the casing 30 or the wheel member 49 is further enhanced (for example, as in the embodiment of FIG. 6 described later, compared to a method of providing a construction in which the entire periphery further toward the side opposite to the vehicle body than a height difference 230C is cutoff). In addition, in an area A2 (an area further toward the side opposite to the vehicle body than the area A1), the casing 30 has a small diameter over the entire periphery, so that a disposition space of the bolt 47 is ensured.

In addition, in this embodiment, the dimension L1 from the point 46C1 of action of the outside bearing 46 to the center 50C1 in the axial direction of the wheel (tire) 50 is smaller than the dimension L2 from the point 48C1 of action of the inside bearing 48 to the center 50C1 in the axial direction of the wheel 50 (L1<L2). Therefore, the disposition of the outside bearing 46 is difficult due to the small outer diameter d1 of the outside bearing.

However, in this embodiment, the outside bearing 46 is greater than the inside bearing 48 in the load rating, a load may be supported by the wheel 50 side in a stable state (even though the outer diameter d1 of the outside bearing 46 is small).

Moreover, in this embodiment, since the types of the rolling elements 46B and 48B of the outside bearing 46 and the inside bearing 48 are different (the conical roller and the ball), without a particular increase in the size of the rolling element 46B of the outside bearing 46 (that is, while ensuring the space SP1 on the outside in the diameter direction of the outside bearing 46 to be wide), the load rating of the outside bearing 46 may be increased.

In addition, it is possible to increase the load rating of the bearing on the side opposite to the vehicle body to be greater than the load rating of the bearing on the vehicle body side even though the types of the rolling elements of the bearings are not changed. For example, a method in which both the bearings have the same type (for example, both are angular ball bearings or both are tapered roller bearings) and the diameter or the roller length of the rolling element of the bearing on the side opposite to the vehicle body is made greater than the diameter or the roller length of the bearing on the vehicle body side. In addition, also by changing the respective contact angles θ1 and θ2 of the outside bearing 46 and the inside bearing 48, the balance between the radial load and the thrust load may be adjusted. Particularly, load resistance of the radial load of the outside bearing 46 may be increased.

Figure 4:
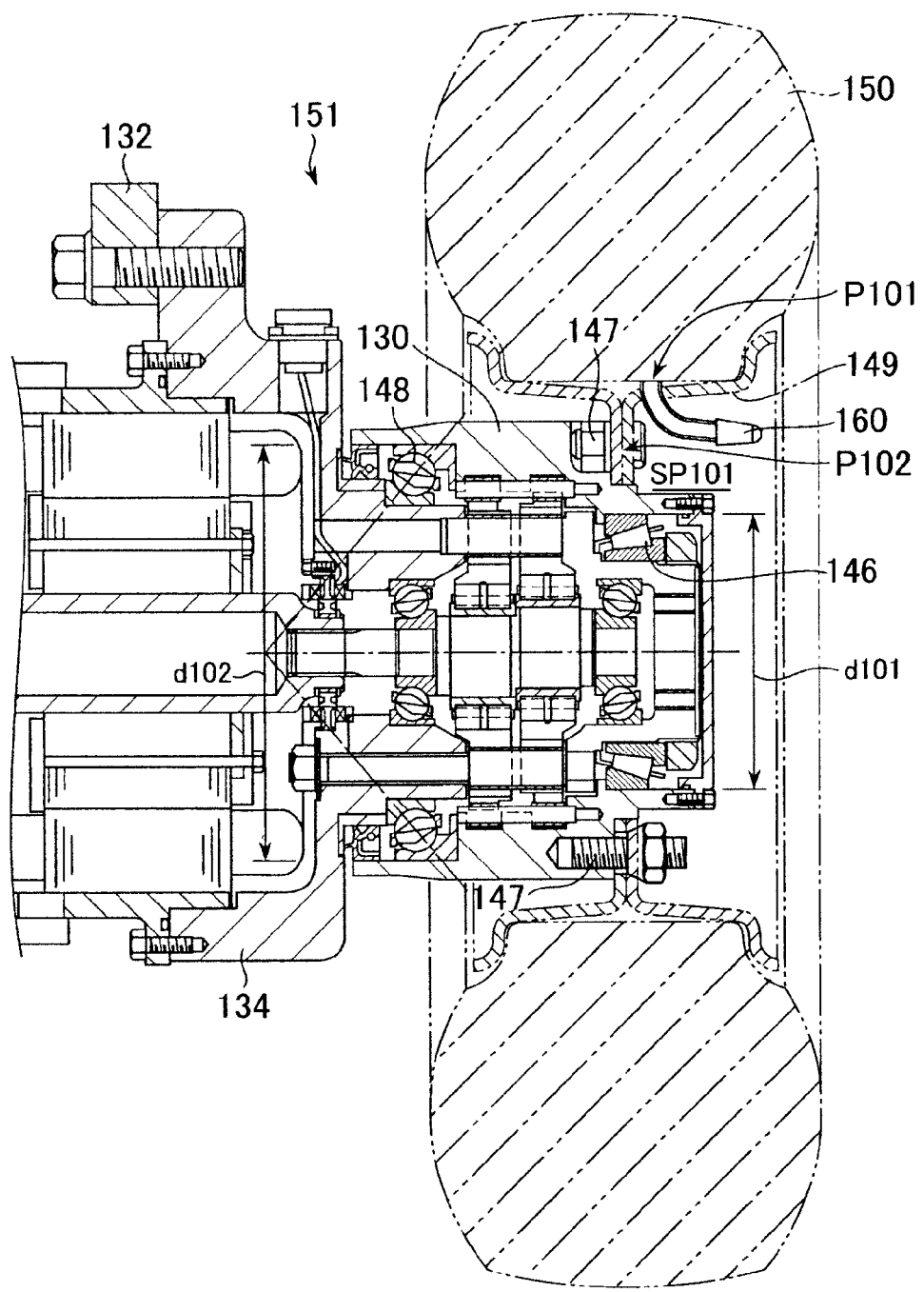
FIG. 4 is an overall cross-sectional view corresponding to FIG. 2 that illustrates an example of another embodiment of the present invention.
Figure 5:
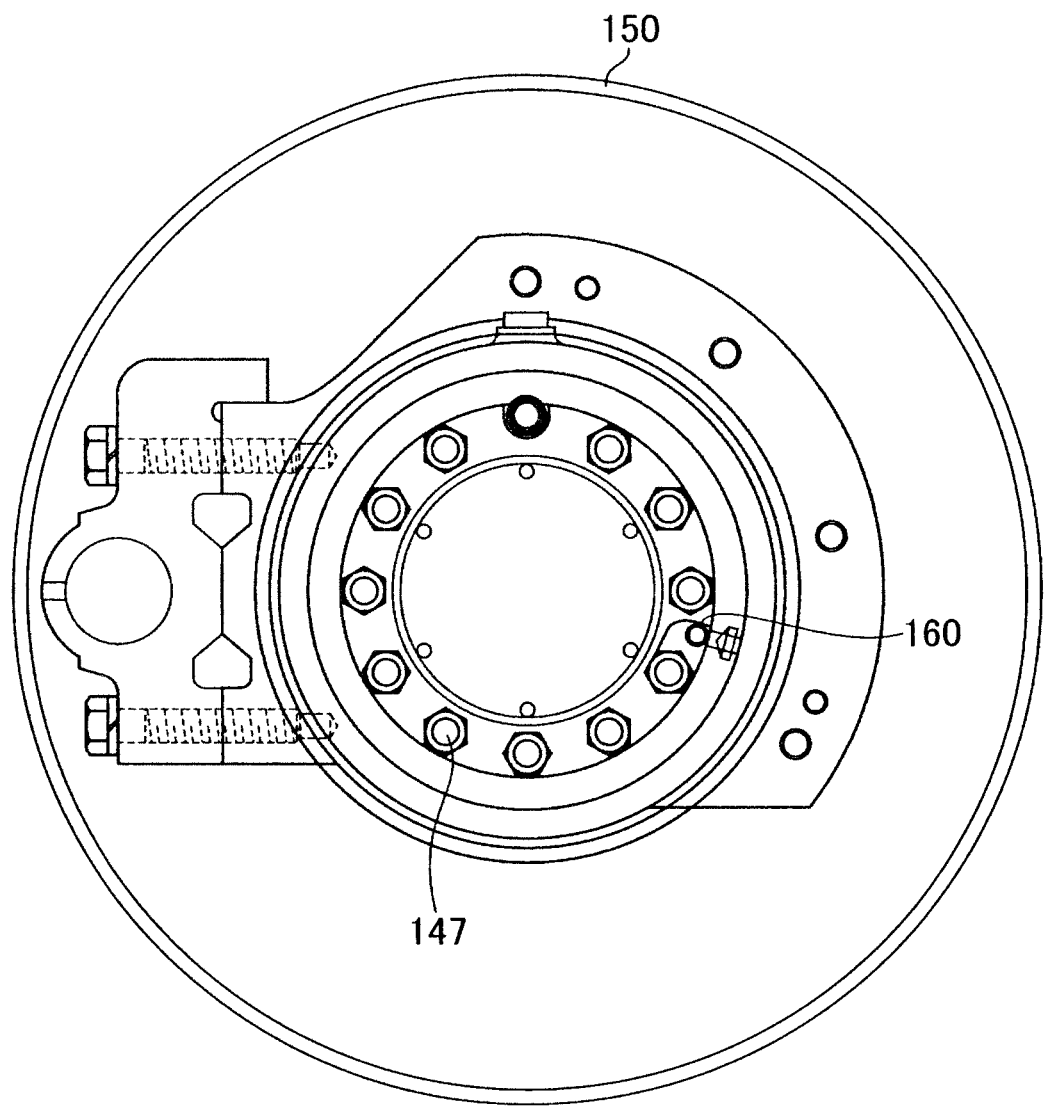
FIG. 5 is a side view of FIG. 4.

An example of another embodiment of the present invention is illustrated in FIGS. 4 and 5.

Even in this embodiment, from main bearings forming a pair supporting a casing 130 which is an output member, the outer diameter d101 of an outside bearing 146 is smaller than the outer diameter d102 of an inside bearing 148 (d101 and d102 are the same as d1 and d2 of the above embodiment). In addition, a tube 160 for air injection is disposed in a space P101 on the outside in the diameter direction of the outside bearing 146 with the suppressed outer diameter d101.

Here, in the above embodiment, the drawing portion P1 of the tube 60 for air injection from the wheel 50 is positioned further toward the vehicle body side in the axial direction than the connection portion P2 between the casing 30 of the reduction device G1 and the wheel member 49 of the wheel 50. However, in this embodiment, a drawing portion P101 of the tube 160 from a wheel 150 is positioned further toward the side opposite to the vehicle body in the axial direction than a connection portion P102 between the casing 130 which is the output member and a wheel member 149.

In this construction, compared to the above embodiment, the center position in the axial direction of the wheel 150 is slightly on the side opposite to the vehicle body (in this embodiment, only a part of the overall length in the axial direction of the reduction direction indents to the inside of the wheel 150) or a slight dead space tends to occur on the inside in the diameter direction of the wheel 150. However, there is no need to form a cutoff (groove) in the casing 130 to avoid interference with the tube 160 for air injection or to form a hole for inserting the tube 160 through the surface orthogonal to the axial direction of the wheel member, the structure is more simple, and manufacturing costs may be reduced compared to the above embodiment.

In this embodiment, since the structures except for the peripheral structure of the casing 130 and the wheel member 149 are the same as those of the above embodiment, in the figures, elements which are the same or similar to those of the above embodiment are denoted by reference numerals which have the same last two digits as those of the above embodiment, and overlapping description may not be mentioned.

Figure 6:
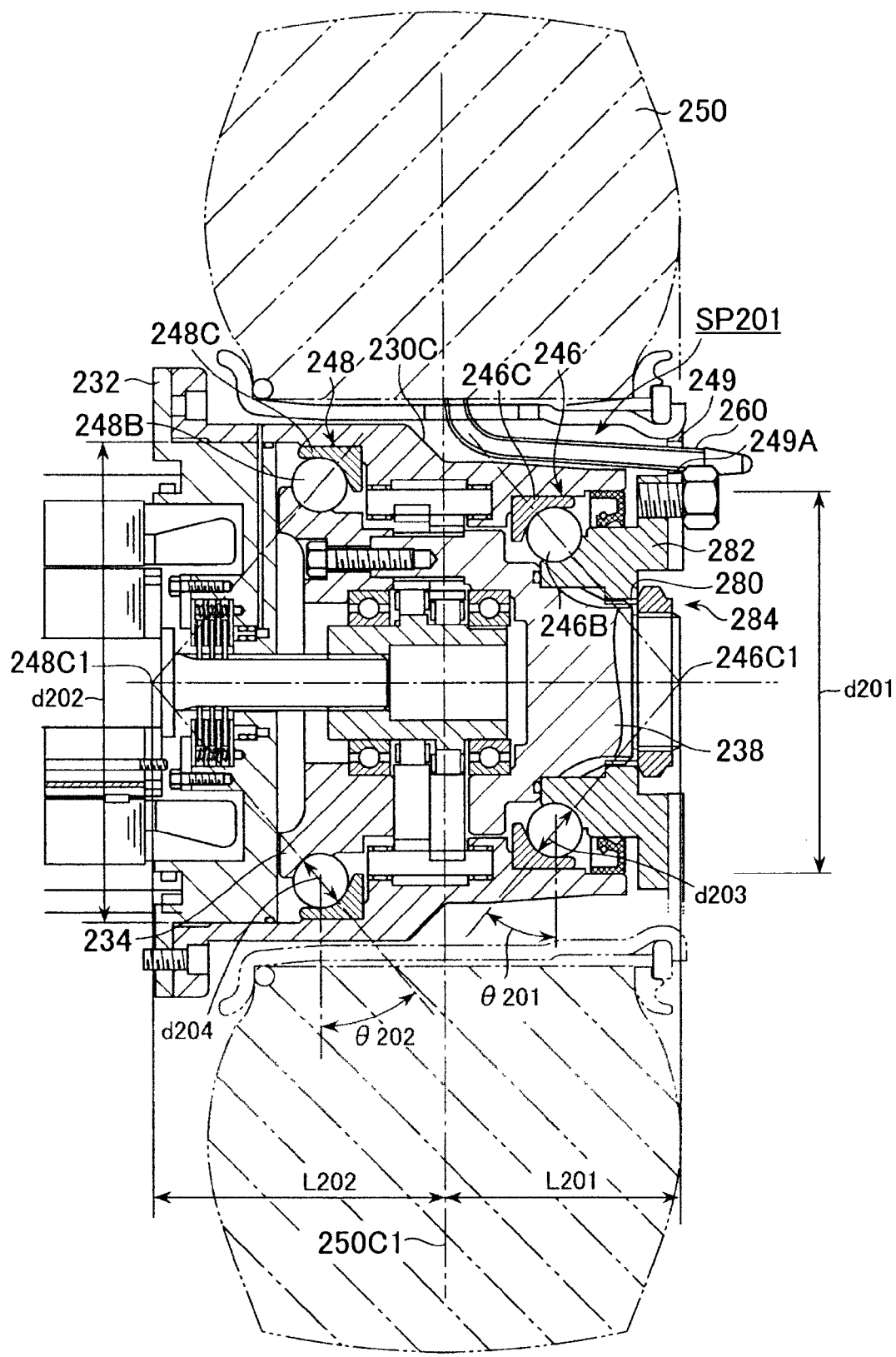
FIG. 6 is a cross-sectional view of the main part corresponding to FIG. 1 that illustrates an example of further another embodiment of the present invention.

FIG. 6 illustrates an example of further another embodiment of the present invention.

In both the two above embodiments, a so-called frame rotation-type reduction mechanism (the reduction mechanism having the casings 30 and 130 as the output members) is employed. However, in this embodiment, a casing 230 is fixed to a vehicle body frame 232. In addition, a flange body 234 in synchronization with the rotation of external gears 224 and 226, a carrier body 238 integrated into the flange body 234, and the entirety of a cover body 282 integrated into the carrier body 238 via a spline 280 constitute a hub block 284 which is an output member.

The hub block 284 is supported by a pair of main bearings, that is, an outside bearing 246 positioned on the side opposite to the vehicle body in the axial direction and an inside bearing 248 positioned on the vehicle body side in the axial direction. In addition, even in this embodiment, the outer diameter d201 of the outside bearing 246 is smaller than the outer diameter d202 of the inside bearing 248, and a tube 260 for air injection is disposed in a space SP201 which is on the outside in the diameter direction of the outside bearing 246 smaller than the outer diameter d202.

A wheel 250, the tube 260, and a wheel member 249 move in one body (do not relatively rotate), and thus the tube 260 is drawn from a hole 249A formed in the wheel member 249. On the other hand, since the casing 230, the wheel 250, the tube 260, and the wheel member 249 rotate relative to each other, a construction in which a cutoff is provided only in a part of the casing 230 where the tube 260 for air injection is disposed may not be employed. Therefore, in this embodiment, a height difference 230C is formed in substantially the half area in the axial direction of the casing 230 (so as not to cause the tube 260 and the casing 230 to interfere with each other) over the entire periphery of the casing 230.

In addition, in this embodiment, regarding the pair of main bearings (supporting the output member), both the outside bearing 246 and the inside bearing 248 are constructed as angular ball bearings, and respective rolling elements 246B and 248B thereof are constructed as the same type of "ball". In addition, the cover body 282 also functions as the inner race of the outside bearing 246, and the flange body 234 also functions as the inner face of the inside bearing 248.

In addition, in this embodiment, the diameters d203 and d204 of the respective rolling elements 246B and 248B of the outside bearing 246 and the inside bearing 248 are the same, and the contact angles θ201 and θ202 of both the bearings 246 and 248 are the same.

This is based on the reason that, in this embodiment, the dimension L201 from the point 246C1 of action of the outside bearing 246 to the center 250C1 in the axial direction of the wheel 250 is not significantly different from the dimension L202 from the point 248C1 of action of the inside bearing 248 to the center 250C1 in the axial direction of the wheel 250 to the degree in the above embodiment and thus there is no particular problem even though the same angular ball bearings are used for the rolling elements 246B and 248B (although the inside bearing 248 obtains slightly excessive quality). Using the angular ball bearings having the same type of rolling elements 246B and 248B at the low cost as the outside bearing 246 and the inside bearing 248, a reduction in costs may be achieved. In addition, compared to a case of using a conical roller, transmission loss is small.

As such, according to the embodiments of the present invention, the types of the rolling elements of the pair of bearings supporting the output member may not be necessarily different. Particularly, in the case where the dimension from the point of action of the bearing on the side opposite to the vehicle body to the center in the axial direction of the wheel is greater than the dimension from the point of action of the bearing on the vehicle body side to the center in the axial direction of the wheel or the like, a burden on the load of the bearing on the side opposite to the vehicle body is relatively reduced, the same type of rolling elements may be used.

Of course, for example, even in the embodiment of FIG. 6, the load rating of the outside bearing may be freely further increased by using, as the outside bearing, the angular ball bearing having a rolling element (as the same type of ball) with a greater diameter, or a tapered roller bearing having a rolling element in a different type of a conical roller.

Since other constructions are the same as those of the above embodiments, in the figures, elements which are the same or similar to those of the above embodiment are denoted by reference numerals which have the same last two digits as those of the above embodiment, and overlapping description may not be mentioned.

In addition, in all the above embodiments, the eccentric oscillation-type planetary gear mechanism having the eccentric body as the input shaft disposed at the center of the external gear is employed as the reduction mechanism. However, in the present invention, the construction of the reduction mechanism is not particularly limited. For example, an eccentric oscillation-type planetary gear mechanism may also be employed in which an external gear is oscillated as a plurality of eccentric body shafts are simultaneously rotated at a position offset from the center of the external gear. In addition, a simple planetary gear reduction mechanism, a parallel shaft reduction mechanism, an orthogonal shaft reduction mechanism, or the like may also be employed, and a combination thereof may also be employed.

In addition, in the above embodiments, the example in which the wheel driving device according to the present invention is applied to a forklift truck is described. However, the wheel driving device according to the present invention may be widely applied to vehicles and the like other than the forklift truck.

In addition, in the above embodiments, the cutoff 30A is formed along the axial direction. However, the present invention is not limited to this, and for example, the cutoff 30A may be formed obliquely with respect to the axial direction.

It should be understood that the invention is not limited to the above-described embodiment, but may be modified into various forms on the basis of the spirit of the invention. Additionally, the modifications are included in the scope of the invention.

What is claimed is:

1. A wheel driving device comprising an injection passage member of a medium injected into a wheel, the wheel driving device configured to drive the wheel by output rotation of a reduction device disposed on an inside in a radial direction of the wheel, wherein the reduction device includes an output member connected to the wheel, and a pair of bearings supporting the output member, wherein in the pair of bearings, the bearing on a side opposite to a vehicle body has a smaller outer diameter than that of the bearing on a vehicle body side, wherein the injection passage member is disposed on an outside in a diameter direction of the bearing on the side opposite to the vehicle body, wherein the bearing on the side opposite to the vehicle body and the injection passage member are overlapped when they are viewed from a radial direction, and wherein the bearing on the side opposite to the vehicle body is smaller than the bearing on the vehicle body side in a contact angle.

2. The wheel driving device according to claim 1, wherein a dimension from a point of action of the bearing on the vehicle body side to a center in an axial direction of the wheel is greater than a dimension from a point of action of the bearing on the side opposite to the vehicle body to the center in the axial direction of the wheel, and the bearing on the side opposite to the vehicle body is greater than the bearing on the vehicle body side in a load rating.

3. The wheel driving device according to claim 1, wherein a drawing portion of the injection passage member from the wheel is further toward the vehicle body side in the axial direction than a connection portion between the output member of the reduction device and a wheel member of the wheel.

4. The wheel driving device according to claim 1, wherein the output member is a casing of the reduction device, and a cutoff where the injection passage member is disposed is formed in an outer periphery of the casing.

5. The wheel driving device according to claim 4, wherein a hole through which the injection passage member is inserted is formed in a wheel member of the wheel connected to the casing at a position corresponding to the cutoff of the casing.

6. A wheel driving device comprising an injection passage member of a medium injected into a wheel, the wheel driving device configured to drive the wheel by output rotation of a reduction device disposed on an inside in a radial direction of the wheel, wherein the reduction device includes an output member connected to the wheel, and a pair of bearings supporting the output member, wherein in the pair of bearings, the bearing on a side opposite to a vehicle body has a smaller outer diameter than that of the bearing on a vehicle body side, wherein the injection passage member is disposed on an outside in a diameter direction of the bearing on the side opposite to the vehicle body, wherein the bearing on the side opposite to the vehicle body and the injection passage member are overlapped when they are viewed from a radial direction, wherein a shape of a rolling element of the bearing on the side opposite to the vehicle body and a shape of a rolling element of the bearing on the vehicle body side are different from each other, wherein a load rating of the rolling element of the bearing on the side opposite to the vehicle body is greater than a load rating of the rolling element of the bearing on the vehicle body side, and wherein the bearing on the side opposite to the vehicle body is a tapered roller bearing, and the bearing on the vehicle body side is an angular ball bearing.

* * * * *